United States Patent [19]
Yamakawa

[11] Patent Number: 5,506,729
[45] Date of Patent: Apr. 9, 1996

[54] COPY LENS

[75] Inventor: Hiromitsu Yamakawa, Omiya, Japan

[73] Assignee: Fuji Photo Optical Co., Ltd., Saitama, Japan

[21] Appl. No.: 314,405

[22] Filed: Sep. 27, 1994

[30] Foreign Application Priority Data

Sep. 29, 1993 [JP] Japan .................................. 5-242353

[51] Int. Cl.⁶ .............................. G02B 9/44; G02B 9/56
[52] U.S. Cl. ............................................. 359/775; 359/778
[58] Field of Search ................................. 359/775, 776, 359/777, 778

[56] References Cited

U.S. PATENT DOCUMENTS 2,986,972  6/1961  Milas ....................................... 359/775

FOREIGN PATENT DOCUMENTS 61-292119  12/1986  Japan .

Primary Examiner—Scott J. Sugarman
Attorney, Agent, or Firm—Young & Thompson

[57] ABSTRACT

A copy lens comprising four lens elements arranged symmetrically with an aperture, namely, in order from the object end to the image end, a first biconvex element and a biconcave element, which are positioned on one side of the aperture, a third biconcave element identical with the second biconcave element and a fourth biconvex element identical with the first biconvex element, which are positioned on another side of the aperture.

10 Claims, 5 Drawing Sheets

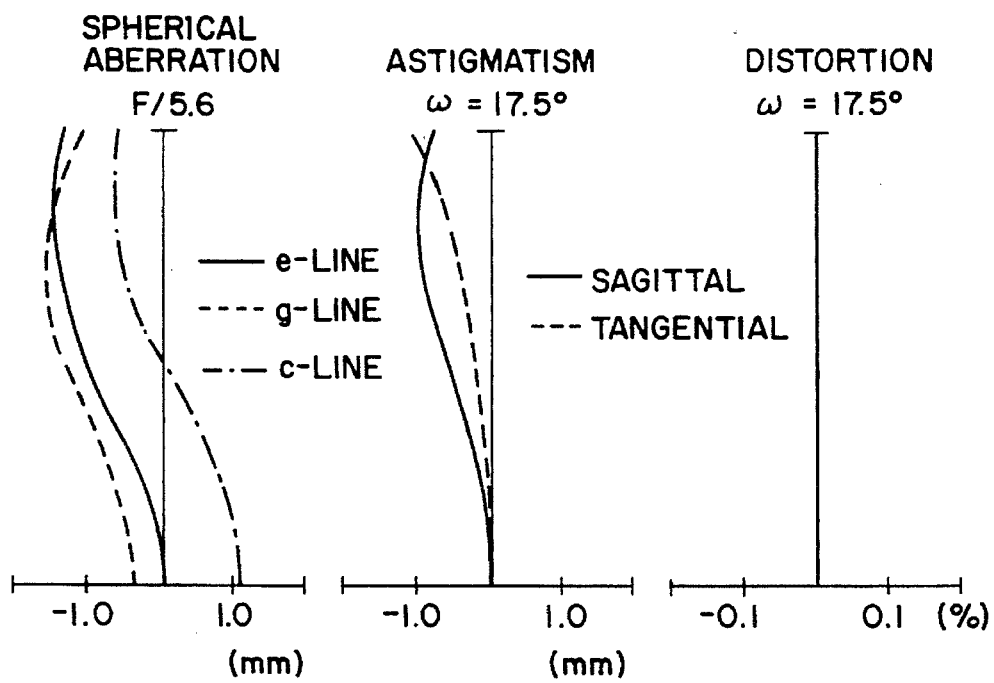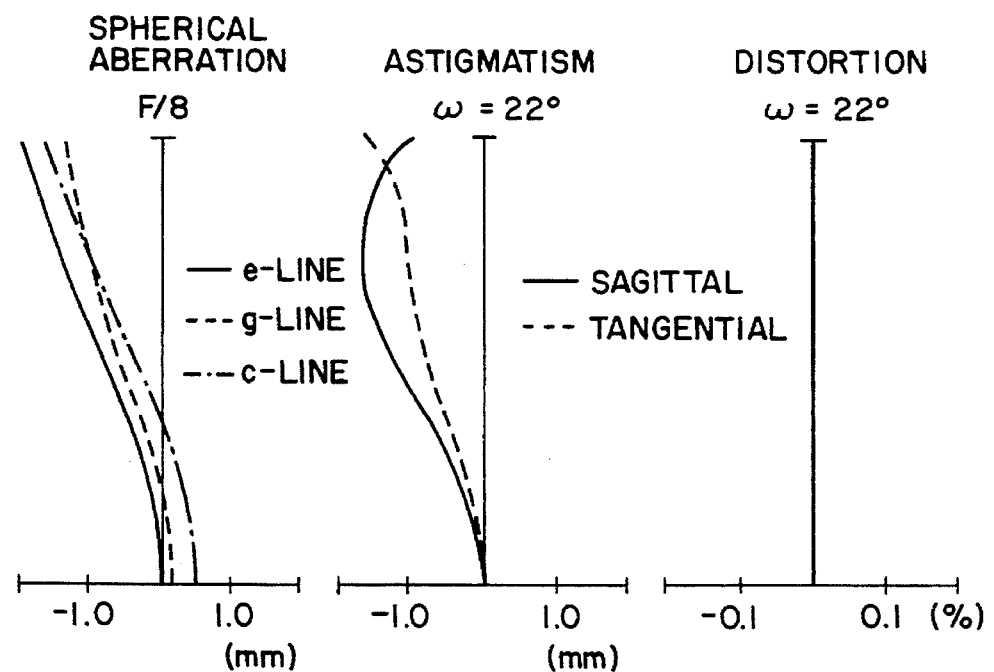

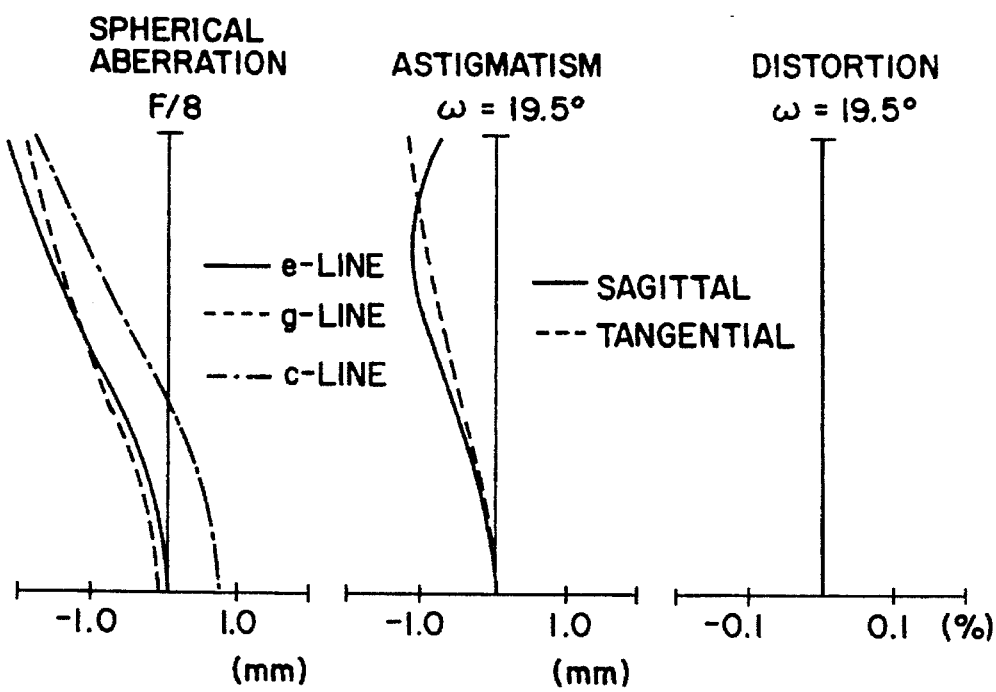
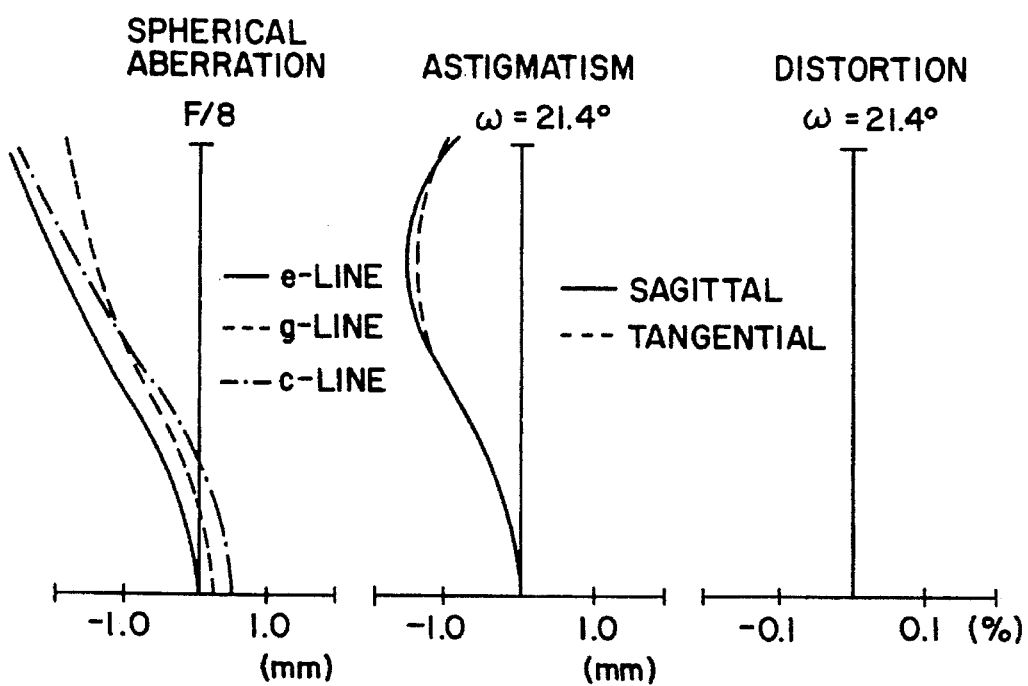

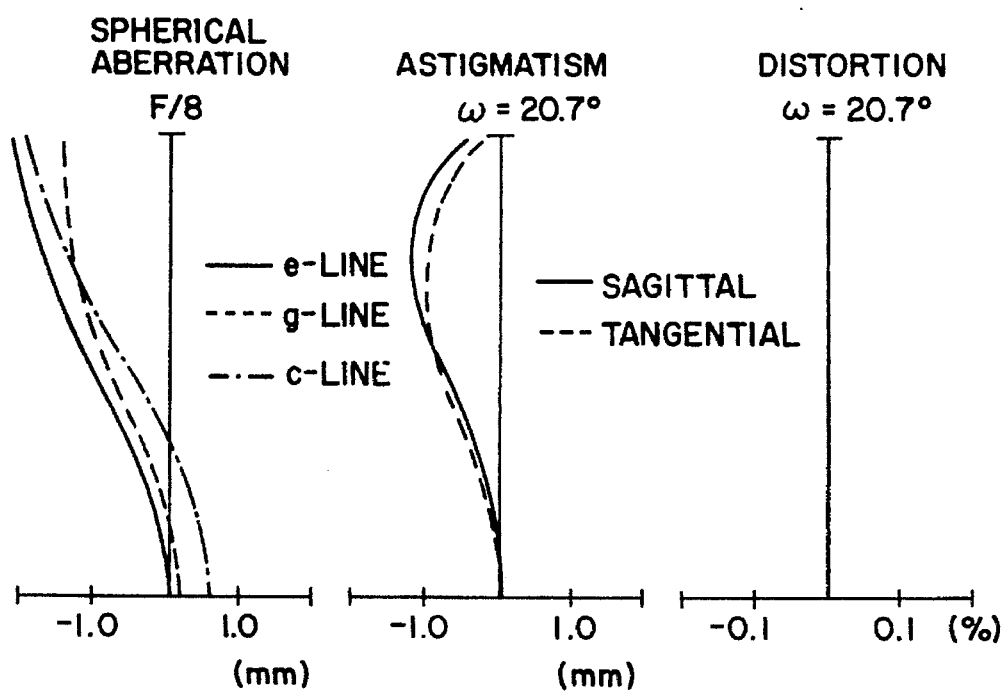
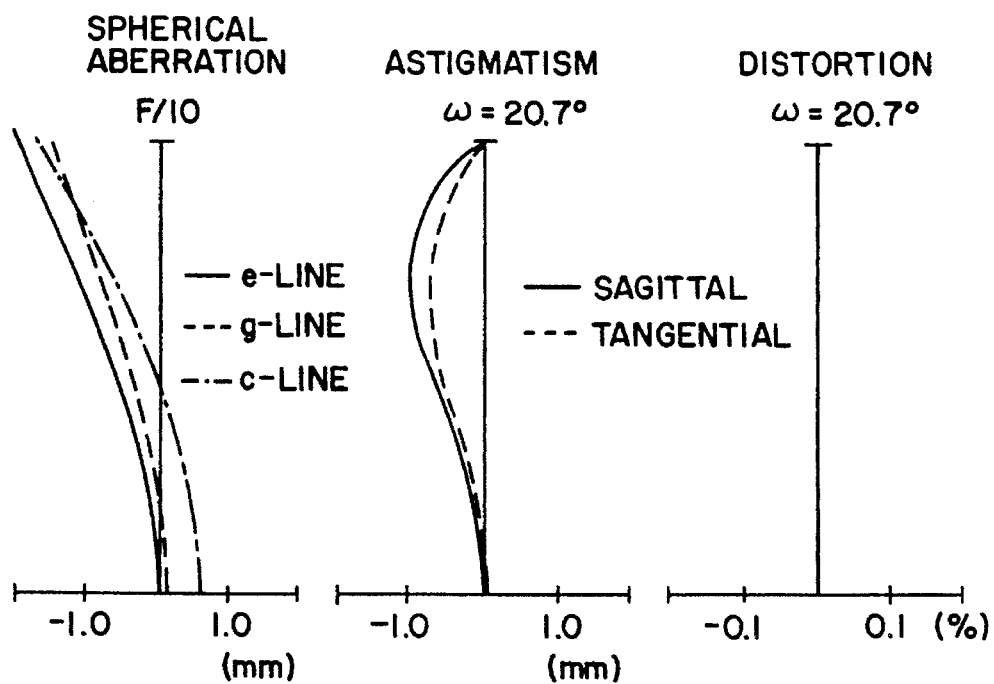

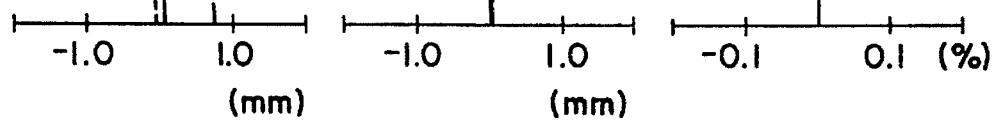
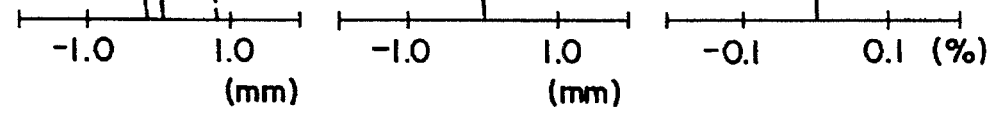

COPY LENS

BACKGROUND OF THE INVENTION

1. Field of the Invention

The resent invention relates to a copy lens for copy machines and processing equipments suitable for reproducing images as large as originals, and, more particularly, to a copy lens comprising four lens elements arranged in symmetrical with an aperture of the copy lens.

2. Description of Related Art

Much attention has given to various optical approaches relating to compact and low cost copy machines which include four element copy lenses. In most copy lenses lens elements are arranged symmetrically with an aperture to reduce the number of lens elements for satisfying demands in the field of copy equipment industry toward compactness and cheapness. The symmetrical arrangement of four element copy lenses enables these lenses to be assembled through a reduced number of processes and, consequently yield manufacturing cost saving in addition to a great reduction in aggravation of optical characteristics, such as distortion.

Examples of such four element copy lenses are described in, for instance, Japanese Unexamined Patent Publications Nos. 55- 81316, 57-161823, 58- 9118 and 61- 292119. In particular, the copy lens described in Japanese Unexamined Patent Publications No. 61- 292119 has proven to be an excellent copy lens and is compact and well corrected on various aberrations.

While the copy lenses as described in the above-mentioned publications may have advantages over prior art, nevertheless, a more economical constraint must be imposed upon the material, processability and price of each lens element which are always user's demands.

SUMMARY OF THE INVENTION

It is an object of the present invention to provide a four element copy lens which enables an optimum utilization of inexpensive materials and yields easy works, such as processing and polishing, for manufacturing lens elements, thereby providing a great reduction in manufacturing cost.

It is another object of the present invention to provide a four element copy lens which provides a favorable correction on geometric aberrations.

The foregoing objects of the present invention is achieved by providing a copy lens comprised of four lens elements, which are arranged symmetrically with an aperture, namely, in order from the object end to the image end, a first biconvex element and a biconcave element, which are positioned on one side of the aperture, a third biconcave element identical with the second biconcave element and a fourth biconvex element identical with the first biconvex element, which are positioned on the other side of the aperture. The copy lens must satisfy the following conditions:

$$0.5 < R1/R2 < -0.28 \quad (I)$$

$$1.4 < R2/R3 < 2.4 \quad (II)$$

$$0.022 < d4/f < 0.036 \quad (III)$$

$$1.85 < N_1 - v_1/216 < 1.91 \quad (IV)$$

$$0.05 < F \cdot d3/f < 0.2 \quad (V)$$

where f is the overall focal length of the copy lens;

R1 is the radius of the object side surface of the first element;

R2 is the radius of the image side surface of the first element of the first element;

R3 is the radius of the object side surface of the first element of the second element;

d3 is the axial distance between surfaces of the second element;

d4 is the axial distance between adjacent surfaces of the second and third elements;

$N_1$ is the index of refraction of the first element;

$v_1$ is the Abbe number of the first element; and

F is the F number of the copy lens.

The parameters set fourth are necessary for suitably balancing the aberrations of the copy lens. Together, the conditions prevent or significantly reduce aggravation of geometric aberrations, such as spherical aberration, coma, astigmatism, field curvature, and chromatic or color aberrations. Satisfaction of these conditions prevents adverse effects of manufacturing errors against the copy lens performance, and provides an optimum utilization of cheap materials and ensures low production costs.

The symmetrical arrangement of four elements with respect to the aperture provides favorable correction of distortion and distributes to an decreased number of manufacturing processes and easy assembling of the copy lens which yields a decrease in lens cost.

Specifically, the first parameter (-0.5<R1/R2<-0.28) provides optimum spherical aberration and coma necessary for desired lens performance. If the upper and lower limits are exceeded, the copy lens leads to insufficient corrections on spherical aberration and an increase in coma. Further, if the lower limit is exceeded, there occurs aggravation of the lens performance due to manufacturing errors.

The second parameter (1.4<R2/R3<2.4) provides optimum spherical aberration and astigmatism necessary for desired lens performance. If the upper limit is exceeded, there occur an over correction on spherical aberration and an increase in astigmatism. On the other hand, if the lower limit is exceeded, an insufficient correction occurs on spherical aberration.

The third parameter (0.022<d4/f<0.036) provides optimum field curvature and astigmatism necessary for desired lens performance. If the upper limit is exceeded, there occurs an increase in field curvature. On the other hand, if the lower limit is exceeded, there occurs an increase in astigmatism.

The fourth parameter (1.85<$N_1-v_1$/216<1.91) provides optimum astigmatism and chromatic or color aberrations necessary for desired lens performance. Satisfaction of the condition yields an optimum utilization of cheap materials for the lens elements. Materials are expensive if they exceed the upper limit and undesirable for the lens elements to ensure corrections on astigmatism and chromatic aberrations all at once.

Finally, the fifth parameter (0.05<F·d3/f<0.2) provides reduced manufacturing costs of the copy lens. If the upper limit is exceeded, the lens elements have to be thick, leading to an increase in material consumption, and hence, to aggravation of cost performance. On the other hand, if the lower limit is exceeded, the lens elements, in particular the second and third lens elements, are rendered difficult to be manufactured with a high accuracy of finishing and at a low cost.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 2 is a graphic showing various aberrations for a copy lens in accordance with a first preferred embodiment of the present invention;

FIG. 3 is a graphic showing various aberrations for a copy lens in accordance with a second preferred embodiment of the present invention;

FIG. 4 is a graphic showing various aberrations for a copy lens in accordance with a third preferred embodiment of the present invention;

FIG. 5 is a graphic showing various aberrations for a copy lens in accordance with a fourth preferred embodiment of the present invention;

FIG. 6 is a graphic showing various aberrations for a copy lens in accordance with a fifth preferred embodiment of the present invention;

FIG. 7 is a graphic showing various aberrations for a copy lens in accordance with a sixth preferred embodiment of the present invention;

FIG. 8 is a graphic showing various aberrations for a copy lens in accordance with a seventh preferred embodiment of the present invention; and FIG. 9 is a graphic showing various aberrations for a copy lens in accordance with a eighth preferred embodiment of the present invention.

DETAILED DESCRIPTION OF THE PREFERRED EMBODIMENTS

Figure 1:
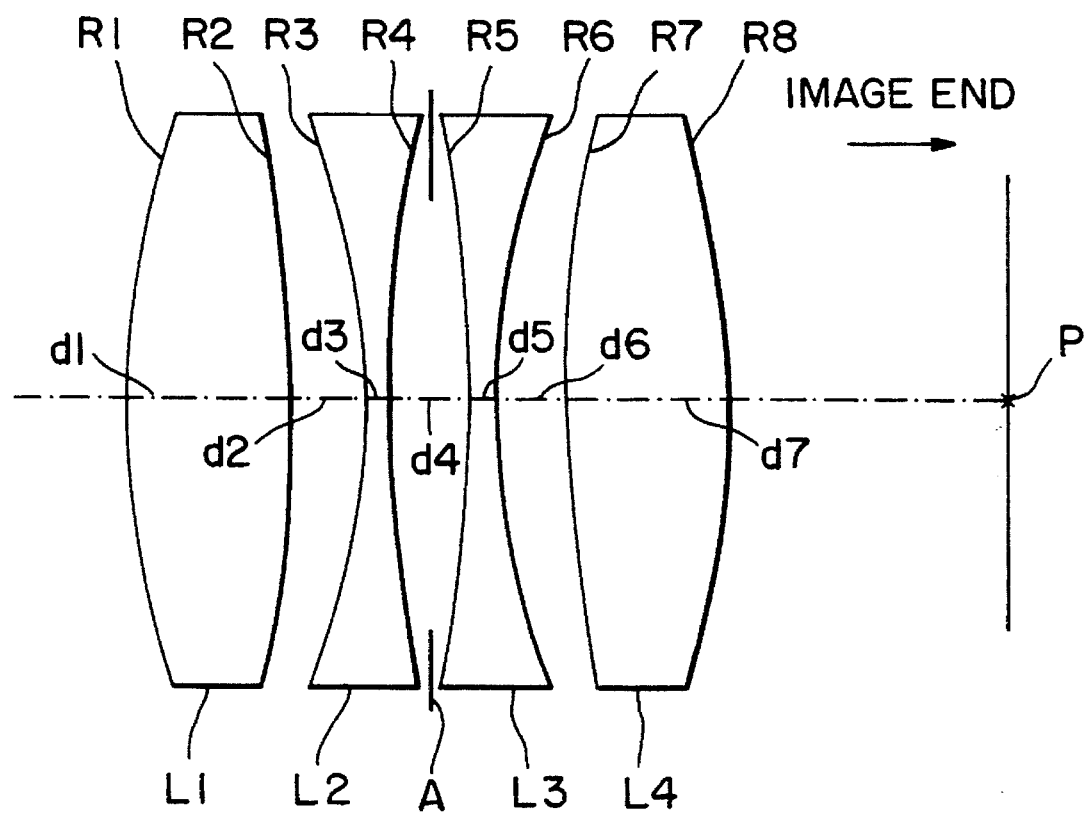
FIG. 1 is a grammatical side view of a basic optical configuration of the copy lens of the present invention.

Referring now to the drawings in detail, and in particular, to FIG. 1, a copy lens of the present invention comprises four lens elements, namely, in order from the object end to the image end, a first biconvex element and a biconcave element, which are positioned on one side of the aperture, a third biconcave element identical with the second biconcave element and a fourth biconvex element identical with the first biconvex element, which are positioned on the other side of the aperture. The copy lens must satisfy the following conditions:

$$0.5 < R1/R2 < -0.28 \quad (I)$$

$$1.4 < R2/R3 < 2.4 \quad (II)$$

$$0.022 < d4/f < 0.036 \quad (III)$$

$$1.85 < N_{1-v_1}/216 < 1.91 \quad (IV)$$

$$0.05 < F \cdot d3/f < 0.2 \quad (V)$$

where f is the overall focal length of the copy lens;

R1 is the radius of the object side surface of the first element;

R2 is the radius of the object side surface of the second element;

R3 is the radius of the object side surface of the third element;

d3 is the axial distance between surfaces of the second element;

d4 is the axial distance between adjacent surfaces of the second and third elements;

$N_1$ is the index of refraction of the first element;

$v_1$ is the Abbe number of the first element; and

F is the F number of the copy lens.

As was previously described, satisfaction of the conditions (I)–(IV) provides a suitable balance of the geometric aberrations of the copy lens, such as spherical aberration and coma and reduce aggravation of the geometric aberrations of the copy lens, such as field curvature and astigmatism, and chromatic aberrations. This results in the prevention of adverse effects of manufacturing errors against the copy lens performance. Together, satisfaction of the conditions (IV) yields an optimum utilization of cheap materials for the lens elements. Satisfaction of the condition (V) enables a reduction in lens thickness which is contributory to saving materials costs and manufacturing costs.

The copy lens is desirable to satisfy additionally the following conditions:

$$0.80 < R1/f_1 < 0.91 \quad (VI)$$

$$0.26 < f_1/f < 0.42 \quad (VII)$$

$$-0.45 < f_2/f < -0.28 \quad (VIII)$$

$$48 < v_1 < 62 \quad (IX)$$

$$38 < v_2 < 50 \quad (X)$$

where $f_1$ is the focal length of the first element;

$f_2$ is the focal length of the second element; and $v_2$ is the Abbe number of the first element.

The parameters set fourth are desirable for more suitably balancing the aberrations of the copy lens. Together, the conditions prevent or significantly reduce aggravation of geometric aberrations, such as spherical aberration, coma, astigmatism, field curvature, and chromatic or color aberrations.

The sixth parameter ($0.80 < R1/f_1 < 0.91$) provides optimum field curvature and astigmatism desired for higher lens performance. If the upper and lower limits are exceeded, the copy lens experiences a large astigmatism. On the other hand, if the lower limit is exceeded, it experiences a large field curvature.

The seventh parameter ($0.26 < f_1/f < 0.42$) provides optimum field curvature and astigmatism desirable for higher lens performance. If the upper limit is exceeded, the copy lens experiences a large field curvature. Conversely, if the lower limit is exceeded, it experiences a large astigmatism and occurs an increase in adverse effects of manufacturing errors against the copy lens performance.

The eighth parameter ($-0.45 < f_2/f < -0.28$) provides optimum field curvature and astigmatism desirable for higher lens performance. If the upper limit is exceeded, there occurs an increase in astigmatism. On the other hand, if the lower limit is exceeded, there occurs an increase in field curvature.

The ninth parameter ($48 < v_1 < 62$) provides optimum astigmatism and chromatic or color aberrations desirable for higher lens performance. Satisfaction of the condition yields an optimum utilization of cheap materials for the lens elements along with an optimum correction on both astigmatism and color aberrations all at once. The concurrent optimum correction on astigmatism and color aberrations is realized only when the tenth condition ($38 < v_2 < 50$) is satisfied.

In the following tables, various embodiments of the invention are set forth. In the following prescription tables, the reference L followed by an arabic numeral indicates the lens element progressively from the object end to the image end of the lens. The reference radius numbers R are the progressive lens surface radii in millimeter (mm). Positive surface radii are struck from the right of the lens surface on the optical axis. Negative surface radii are struck from the left of the lens surface on the optical axis. The reference distance numbers d are the progressive axial distances between adjacent surfaces in millimeter (mm). $\supset$ is the angle of view provided by the copy lens. Nd is the index of refraction of the lens element for a d-line spectrum and $v_d$ is the Abbe number for a d-line spectrum. The following examples in Tables I~IV are exemplary of copy lenses according to preferred embodiments of the present invention.

TABLE I

| Lens Element | Radius of Curvature | Axial Distance Between Surfaces | Nd | $v_d$ |
|---|---|---|---|---|
| L1 | R1 31.264 | | | |
| | | d1 5.391 | 1.62041 | 60.3 |
| | R2 −89.946 | | | |
| | | d2 2.868 | | |
| | R3 −42.155 | | | |
| L2 | | d3 1.332 | 1.53236 | 46.0 |
| | R4 47.505 | | | |
| | | d4 2.604 | | |
| | R5 −47.505 | | | |
| L3 | | d5 1.332 | 1.53236 | 46.0 |
| | R6 42.155 | | | |
| | | d6 2.868 | | |
| | R7 89.946 | | | |
| L4 | | d7 5.391 | 1.62041 | 60.3 |
| | R8 −31.264 | | | |

| Parameters (f = 100 mm; F = 5.6; $\supset$/2 = 17.5°) ||||||
|---|---|---|---|---|---|---|
| R1/R2 | R1/R2 | $N_1 - v_1/216$ | $F \cdot /f$ | $R1/f_1$ | $f_1/f$ | $f_2/f$ |
| −0.348 | 2.134 | 1.900 | 0.0746 | 0.822 | 0.380 | −0.417 |

FIG. 2 illustrates various optical characteristics of the copy lens of Table I, such as (A) spherical aberration, (B) astigmatism, and (C) distortion.

TABLE II

| Lens Element | Radius of Curvature | Axial Distance Between Surfaces | Nd | $v_d$ |
|---|---|---|---|---|
| L1 | R1 27.810 | | | |
| | | d1 5.008 | 1.62280 | 56.9 |
| | R2 −58.097 | | | |
| | | d2 1.114 | | |
| | R3 −38.526 | | | |
| L2 | | d3 1.168 | 1.54869 | 45.4 |
| | R4 34.756 | | | |
| | | d4 3.075 | | |
| | R5 −34.756 | | | |
| L3 | | d5 1.168 | 1.54869 | 45.4 |
| | R6 38.526 | | | |
| | | d6 1.114 | | |
| | R7 58.097 | | | |
| L4 | | d7 5.008 | 1.62280 | 56.9 |
| | R8 −27.810 | | | |

| Parameters (f = 100 mm; F = 8; $\supset$/2 = 22°) ||||||
|---|---|---|---|---|---|---|
| R1/R2 | R1/R2 | $N_1 - v_1/216$ | $F \cdot /f$ | $R1/f_1$ | $f_1/f$ | $f_2/f$ |
| −0.479 | 1.508 | 1.886 | 0.0934 | 0.900 | 0.309 | −0.331 |

FIG. 3 illustrates various optical characteristics of the copy lens of Table II, such as (A) spherical aberration, (B) astigmatism, and (C) distortion.

TABLE III

| Lens Element | Radius of Curvature | Axial Distance Between Surfaces | Nd | $v_d$ |
|---|---|---|---|---|
| L1 | R1 26.574 | | | |
| | | d1 3.945 | 1.62299 | 58.1 |
| | R2 −57.470 | | | |
| | | d2 1.107 | | |
| | R3 −38.161 | | | |
| L2 | | d3 1.813 | 1.54072 | 47.2 |
| | R4 31.521 | | | |
| | | d4 2.404 | | |
| | R5 −31.521 | | | |
| L3 | | d5 1.813 | 1.54072 | 47.2 |
| | R6 38.161 | | | |
| | | d6 1.107 | | |
| | R7 57.470 | | | |
| L4 | | d7 3.945 | 1.62299 | 58.1 |
| | R8 −27.810 | | | |

| Parameters (f = 100 mm; F = 8; $\supset$/2 = 19.5°) ||||||
|---|---|---|---|---|---|---|
| R1/R2 | R1/R2 | $N_1 - v_1/216$ | $F \cdot /f$ | $R1/f_1$ | $f_1/f$ | $f_2/f$ |
| −0.462 | 1.506 | 1.892 | 0.145 | 0.895 | 0.297 | −0.316 |

FIG. 4 illustrates various optical characteristics of the copy lens of Table III, such as (A) spherical aberration, (B) astigmatism, and (C) distortion.

TABLE IV

| Lens Element | Radius of Curvature | Axial Distance Between Surfaces | Nd | $v_d$ |
|---|---|---|---|---|
| L1 | R1 24.433 | | | |
| | | d1 2.896 | 1.62299 | 58.1 |
| | R2 −66.338 | | | |
| | | d2 1.116 | | |
| | R3 −39.739 | | | |
| L2 | | d3 0.895 | 1.54072 | 47.2 |
| | R4 29.768 | | | |
| | | d4 3.265 | | |
| | R5 −29.768 | | | |
| L3 | | d5 0.895 | 1.54072 | 47.2 |
| | R6 39.739 | | | |
| | | d6 1.116 | | |
| | R7 66.338 | | | |
| L4 | | d7 2.896 | 1.62299 | 58.1 |
| | R8 −24.433 | | | |

| Parameters (f = 100 mm; F = 8; $\supset$/2 = 21.4°) ||||||
|---|---|---|---|---|---|---|
| R1/R2 | R1/R2 | $N_1 - v_1/216$ | $F \cdot d3/f$ | $R1/f_1$ | $f_1/f$ | $f_2/f$ |
| −0.368 | 1.669 | 1.892 | 0.0716 | 0.842 | 0.290 | −0.313 |

FIG. 5 illustrates various optical characteristics of the copy lens of Table IV, such as (A) spherical aberration, (B) astigmatism, and (C) distortion.

TABLE V

| Lens Element | Radius of Curvature | Axial Distance Between Surfaces | Nd | $v_d$ |
|---|---|---|---|---|
| L1 | R1 24.148 | | | |
| | | d1 2.946 | 1.62299 | 58.1 |
| | R2 −69.583 | | | |
| | | d2 1.182 | | |
| | R3 −39.730 | | | |
| L2 | | d3 0.882 | 1.54072 | 47.2 |
| | R4 29.835 | | | |
| | | d4 2.752 | | |
| | R5 −29.835 | | | |
| L3 | | d5 0.882 | 1.54072 | 47.2 |
| | R6 39.730 | | | |

TABLE V-continued

|  |  | d6 1.182 |  |  |
|---|---|---|---|---|
|  | R7 69.583 |  |  |  |
| L4 |  | d7 2.946 | 1.62299 | 58.1 |
|  | R8 −24.148 |  |  |  |

| Parameters (f = 100 mm; F = 8; ⊃/2 = 20.7°) | | | | | | |
|---|---|---|---|---|---|---|
| R1/R2 | R1/R2 | $N_1 - v_1/216$ | F · /f | R1/$f_1$ | $f_1$/f | $f_2$/f |
| −0.347 | 1.751 | 1.892 | 0.0706 | 0.829 | 0.291 | −0.314 |

FIG. 6 illustrates various optical characteristics of the copy lens of Table V, such as (A) spherical aberration, (B) astigmatism, and (C) distortion.

TABLE VI

| Lens Element | Radius of Curvature | Axial Distance Between Surfaces | Nd | $v_d$ |
|---|---|---|---|---|
| L1 | R1 23.404 |  |  |  |
|  |  | d1 2.234 | 1.62299 | 58.1 |
|  | R2 −75.154 |  |  |  |
|  |  | d2 1.370 |  |  |
| L2 | R3 −39.957 |  |  |  |
|  |  | d3 0.846 | 1.54072 | 47.2 |
|  | R4 29.389 |  |  |  |
|  |  | d4 3.009 |  |  |
| L3 | R5 −29.389 |  |  |  |
|  |  | d5 0.846 | 1.54072 | 47.2 |
|  | R6 39.957 |  |  |  |
|  |  | d6 1.370 |  |  |
| L4 | R7 75.154 |  |  |  |
|  |  | d7 2.234 | 1.62299 | 58.1 |
|  | R8 −23.404 |  |  |  |

| Parameters (f = 100 mm; F = 10; ⊃/2 = 20.7°) | | | | | | |
|---|---|---|---|---|---|---|
| R1/R2 | R1/R2 | $N_1 - v_1/216$ | F · /f | R1/$f_1$ | $f_1$/f | $f_2$/f |
| −0.311 | 1.881 | 1.892 | 0.0846 | 0.810 | 0.289 | −0.312 |

FIG. 7 illustrates various optical characteristics of the copy lens of Table VI, such as (A) spherical aberration, (B) astigmatism, and (C) distortion.

TABLE VII

| Lens Element | Radius of Curvature | Axial Distance Between Surfaces | Nd | $v_d$ |
|---|---|---|---|---|
| L1 | R1 26.912 |  |  |  |
|  |  | d1 5.044 | 1.60311 | 60.7 |
|  | R2 −55.789 |  |  |  |
|  |  | d2 1.136 |  |  |
| L2 | R3 −36.805 |  |  |  |
|  |  | d3 1.083 | 1.53172 | 48.9 |
|  | R4 33.792 |  |  |  |
|  |  | d4 2.599 |  |  |
| L3 | R5 −33.792 |  |  |  |
|  |  | d5 1.083 | 1.53172 | 48.9 |
|  | R6 36.805 |  |  |  |
|  |  | d6 1.136 |  |  |
| L4 | R7 55.789 |  |  |  |
|  |  | d7 5.044 | 1.60311 | 60.7 |
|  | R8 −26.912 |  |  |  |

| Parameters (f = 100 mm; F = 8; ⊃/2 = 21.4°) | | | | | | |
|---|---|---|---|---|---|---|
| R1/R2 | R1/R2 | $N_1 - v_1/216$ | F · /f | R1/$f_1$ | $f_1$/f | $f_2$/f |
| −0.482 | 1.516 | 1.884 | 0.0866 | 0.874 | 0.308 | −0.330 |

FIG. 8 illustrates various optical characteristics of the copy lens of Table VII, such as (A) spherical aberration, (B) astigmatism, and (C) distortion.

TABLE VIII

| Lens Element | Radius of Curvature | Axial Distance Between Surfaces | Nd | $v_d$ |
|---|---|---|---|---|
| L1 | R1 28.153 |  |  |  |
|  |  | d1 4.323 | 1.65844 | 50.8 |
|  | R2 −70.856 |  |  |  |
|  |  | d2 1.267 |  |  |
| L2 | R3 −43.092 |  |  |  |
|  |  | d3 1.436 | 1.58144 | 40.8 |
|  | R4 35.844 |  |  |  |
|  |  | d4 2.872 |  |  |
| L3 | R5 −35.844 |  |  |  |
|  |  | d5 1.436 | 1.58144 | 40.8 |
|  | R6 43.092 |  |  |  |
|  |  | d6 1.267 |  |  |
| L4 | R7 70.856 |  |  |  |
|  |  | d7 4.323 | 1.65844 | 50.8 |
|  | R8 −28.153 |  |  |  |

| Parameters (f = 100 mm; F = 6.3; ⊃/2 = 21.4°) | | | | | | |
|---|---|---|---|---|---|---|
| R1/R2 | R1/R2 | $N_1 - v_1/216$ | F · /f | R1/$f_1$ | $f_1$/f | $f_2$/f |
| −0.397 | 1.644 | 1.894 | 0.0905 | 0.904 | 0.311 | −0.335 |

FIG. 9 illustrates various optical characteristics of the copy lens of Table VIII, such as (A) spherical aberration, (B) astigmatism, and (C) distortion.

As apparent from the tables, all of the copy lenses of Tables I–VIII satisfy the foregoing conditions (I)–(X) necessary for easy works, such as processing and polishing, for manufacturing lens elements, thereby providing a great reduction in manufacturing cost, resulting in well improved and balanced aberrations as shown in FIGS. 2–9.

It is to be understood that although the present invention has been described with regard to preferred embodiments thereof, various other embodiments and variants may occur to those skilled in the art, which are within the scope and spirit of the invention. For example, the radii of the surfaces of each lens element and the axial distance between each adjacent surfaces may be changed as long as the above conditions are satisfied. Such other embodiments and variants are intended to be covered by the appended claims.

What is claimed is:

1. A copy lens comprising four lens elements, which are arranged symmetrically with an aperture in order from the object end to the image end, said four lens elements including a first biconvex element and a biconcave element, which are positioned on one side of said aperture, a third biconcave element identical with said second biconcave element and a fourth biconvex element identical with said first biconvex element, which are positioned on the other side of said aperture, and satisfying the following conditions:

−0.5<R1/R2<−0.28;

1.4<R2/R3<2.4;

0.022<d4/f<0.036;

1.85<$N_1$−$v_1$/216<1.91; and 0.05<F·d3/f<0.2 where f is the overall focal length of said copy lens;

R1 is the radius of an object side surface of said first element;

R2 is the radius of an image side surface of said second element;

R3 is the radius of an object side surface of said second element;

d3 is the axial distance between surfaces of said second element;

d4 is the axial distance between adjacent surfaces of said second and third elements;

$N_1$ is the index of refraction of said first element;
$v_1$ is the Abbe number of said first element; and
F is the F number.

2. A copy lens as defined in claim 1, wherein said four lens elements satisfy the following conditions:

$0.80 < R1/f_1 < 0.91$;
$0.26 < f_1/f < 0.42$;
$-0.45 < f_2/f < -0.28$;
$48 < v_1 < 62$; and
$38 < v_2 < 50$ where $f_1$ is the focal length of said first element;
$f_2$ is the focal length of said second element; and
$v_2$ is the Abbe number of the first element.

3. A copy lens as defined in claim 1, described substantially as follows:

| Lens Element | Radius of Curvature | Axial Distance Between Surfaces | Nd | $v_d$ |
|---|---|---|---|---|
| L1 | R1 31.264 | | | |
| | R2 −89.946 | d1 5.391 | 1.62041 | 60.3 |
| | | d2 2.868 | | |
| L2 | R3 −42.155 | | | |
| | R4 47.505 | d3 1.332 | 1.53236 | 46.0 |
| | | d4 2.604 | | |
| L3 | R5 −47.505 | | | |
| | R6 42.155 | d5 1.332 | 1.53236 | 46.0 |
| | | d6 2.868 | | |
| L4 | R7 89.946 | | | |
| | R8 −31.264 | d7 5.391 | 1.62041 | 60.3 | where the reference L followed by an arabic numeral indicates said lens element progressively from the object end to the image end of said copy lens, the reference radius numbers R are the progressive lens surface radii in millimeter (mm), the reference distance numbers d are the progressive axial distances between adjacent surfaces in millimeter (mm), Nd is the index of refraction of said lens element for a d-line spectrum, and $v_d$ is the Abbe number of said lens element for a d-line spectrum.

4. A copy lens as defined in claim 1, described substantially as follows:

| Lens Element | Radius of Curvature | Axial Distance Between Surfaces | Nd | $v_d$ |
|---|---|---|---|---|
| L1 | R1 27.810 | | | |
| | R2 −58.097 | d1 5.008 | 1.62280 | 56.9 |
| | | d2 1.114 | | |
| L2 | R3 −38.526 | | | |
| | R4 34.756 | d3 1.168 | 1.54869 | 45.4 |
| | | d4 3.075 | | |
| L3 | R5 −34.756 | | | |
| | R6 38.526 | d5 1.168 | 1.54869 | 45.4 |
| | | d6 1.114 | | |
| L4 | R7 58.097 | | | |
| | R8 −27.810 | d7 5.008 | 1.62280 | 56.9 | where the reference L followed by an arabic numeral indicates said lens element progressively from the object end to the image end of said copy lens, the reference radius numbers R are the progressive lens surface radii in millimeter (mm), the reference distance numbers d are the progressive axial distances between adjacent surfaces in millimeter (mm), Nd is the index of refraction of said lens element for a d-line spectrum, and $v_d$ is the Abbe number of said lens element for a d-line spectrum.

5. A copy lens as defined in claim 1, described substantially as follows:

| Lens Element | Radius of Curvature | Axial Distance Between Surfaces | Nd | $v_d$ |
|---|---|---|---|---|
| L1 | R1 26.574 | | | |
| | R2 −57.470 | d1 3.945 | 1.62299 | 58.1 |
| | | d2 1.107 | | |
| L2 | R3 −38.161 | | | |
| | R4 31.521 | d3 1.813 | 1.54072 | 47.2 |
| | | d4 2.404 | | |
| L3 | R5 −31.521 | | | |
| | R6 38.161 | d5 1.813 | 1.54072 | 47.2 |
| | | d6 1.107 | | |
| L4 | R7 57.470 | | | |
| | R8 −27.810 | d7 3.945 | 1.62299 | 58.1 | where the reference L followed by an arabic numeral indicates said lens element progressively from the object end to the image end of said copy lens, the reference radius numbers R are the progressive lens surface radii in millimeter (mm), the reference distance numbers d are the progressive axial distances between adjacent surfaces in millimeter (mm), Nd is the index of refraction of said lens element for a d-line spectrum, and $v_d$ is the Abbe number of said lens element for a d-line spectrum.

6. A copy lens as defined in claim 1, described substantially as follows:

| Lens Element | Radius of Curvature | Axial Distance Between Surfaces | Nd | $v_d$ |
|---|---|---|---|---|
| L1 | R1 24.433 | | | |
| | R2 −66.338 | d1 2.896 | 1.62299 | 58.1 |
| | | d2 1.116 | | |
| L2 | R3 −39.739 | | | |
| | R4 29.768 | d3 0.895 | 1.54072 | 47.2 |
| | | d4 3.265 | | |
| L3 | R5 −29.768 | | | |
| | R6 39.739 | d5 0.895 | 1.54072 | 47.2 |
| | | d6 1.116 | | |
| L4 | R7 66.338 | | | |
| | R8 −24.433 | d7 2.896 | 1.62299 | 58.1 | where the reference L followed by an arabic numeral indicates said lens element progressively from the object end to the image end of said copy lens, the reference radius numbers R are the progressive lens surface radii in millimeter (mm), the reference distance numbers d are the progressive axial distances between adjacent surfaces in millimeter (mm), Nd is the index of refraction of said lens element for a d-line spectrum, and $v_d$ is the Abbe number of said lens element for a d-line spectrum.

7. A copy lens as defined in claim 1, described substantially as follows:

| Lens Element | Radius of Curvature | Axial Distance Between Surfaces | Nd | $v_d$ |
|---|---|---|---|---|
| L1 | R1 24.148 | d1 2.946 | 1.62299 | 58.1 |
| | R2 −69.583 | d2 1.182 | | |
| L2 | R3 −39.730 | d3 0.882 | 1.54072 | 47.2 |
| | R4 29.835 | d4 2.752 | | |
| L3 | R5 −29.835 | d5 0.882 | 1.54072 | 47.2 |
| | R6 39.730 | d6 1.182 | | |
| L4 | R7 69.583 | d7 2.946 | 1.62299 | 58.1 |
| | R8 −24.148 | | | | where the reference L followed by an arabic numeral indicates said lens element progressively from the object end to the image end of said copy lens, the reference radius numbers R are the progressive lens surface radii in millimeter (mm), the reference distance numbers d are the progressive axial distances between adjacent surfaces in millimeter (mm), Nd is the index of refraction of said lens element for a d-line spectrum, and $v_d$ is the Abbe number of said lens element for a d-line spectrum.

8. A copy lens as defined in claim 1, described substantially as follows:

| Lens Element | Radius of Curvature | Axial Distance Between Surfaces | Nd | $v_d$ |
|---|---|---|---|---|
| L1 | R1 23.404 | d1 2.234 | 1.62299 | 58.1 |
| | R2 −75.154 | d2 1.370 | | |
| L2 | R3 −39.957 | d3 0.846 | 1.54072 | 47.2 |
| | R4 29.389 | d4 3.009 | | |
| L3 | R5 −29.389 | d5 0.846 | 1.54072 | 47.2 |
| | R6 39.957 | d6 1.370 | | |
| L4 | R7 75.154 | d7 2.234 | 1.62299 | 58.1 |
| | R8 −23.404 | | | | where the reference L followed by an arabic numeral indicates said lens element progressively from the object end to the image end of said copy lens, the reference radius numbers R are the progressive lens surface radii in millimeter (mm), the reference distance numbers d are the progressive axial distances between adjacent surfaces in millimeter (mm), Nd is the index of refraction of said lens element for a d-line spectrum, and $v_d$ is the Abbe number of said lens element for a d-line spectrum.

9. A copy lens as defined in claim 1, described substantially as follows:

| Lens Element | Radius of Curvature | Axial Distance Between Surfaces | Nd | $v_d$ |
|---|---|---|---|---|
| L1 | R1 26.912 | d1 5.044 | 1.60311 | 60.7 |
| | R2 −55.789 | d2 1.136 | | |
| L2 | R3 −36.805 | d3 1.083 | 1.53172 | 48.9 |
| | R4 33.792 | d4 2.599 | | |
| L3 | R5 −33.792 | d5 1.083 | 1.53172 | 48.9 |
| | R6 36.805 | d6 1.136 | | |
| L4 | R7 55.789 | d7 5.044 | 1.60311 | 60.7 |
| | R8 −26.912 | | | | where the reference L followed by an arabic numeral indicates said lens element progressively from the object end to the image end of said copy lens, the reference radius numbers R are the progressive lens surface radii in millimeter (mm), the reference distance numbers d are the progressive axial distances between adjacent surfaces in millimeter (mm), Nd is the index of refraction of said lens element for a d-line spectrum, and $v_d$ is the Abbe number of said lens element for a d-line spectrum.

10. A copy lens as defined in claim 1, described substantially as follows:

| Lens Element | Radius of Curvature | Axial Distance Between Surfaces | Nd | $v_d$ |
|---|---|---|---|---|
| L1 | R1 28.153 | d1 4.323 | 1.65844 | 50.8 |
| | R2 −70.856 | d2 1.267 | | |
| L2 | R3 −43.092 | d3 1.436 | 1.58144 | 40.8 |
| | R4 35.844 | d4 2.872 | | |
| L3 | R5 −35.844 | d5 1.436 | 1.58144 | 40.8 |
| | R6 43.092 | d6 1.267 | | |
| L4 | R7 70.856 | d7 4.323 | 1.65844 | 50.8 |
| | R8 −28.153 | | | | where the reference L followed by an arabic numeral indicates said lens element progressively from the object end to the image end of said copy lens, the reference radius numbers R are the progressive lens surface radii in millimeter (mm), the reference distance numbers d are the progressive axial distances between adjacent surfaces in millimeter (mm), Nd is the index of refraction of said lens element for a d-line spectrum, and $v_d$ is the Abbe number of said lens element for a d-line spectrum.

* * * * *